United States Patent Office 2,911,167
Patented Nov. 3, 1959

2,911,167
HEAT SEEKER

Fay E. Null and Lumir J. Pleshek, Dayton, Ohio, assignors to the United States of America as represented by the Secretary of the Air Force Application April 8, 1952, Serial No. 281,252

15 Claims. (Cl. 244—14)

(Granted under Title 35, U.S. Code (1952), sec. 266)

The invention described in the following specification and claims may be manufactured and used by or for the Government for governmental purposes, without the payment to us of any royalty thereon.

This invention relates to heat seekers and infrared radiant energy responsive directional control apparatus for dirigible vehicles, such as guided missiles, and more particularly to a scanning method and apparatus for scanning a circular field of view, having for an object the provision of means in which two rotary motions are combined to accomplish a narrow beam of scan of the entire circular field of view.

A further object of the invention is the provision of a scanning drum having radial quartz spoke members arranged to rotate behind a radial slot in an opaque diaphragm having a radiant energy responsive signal pick-off or photo cell means at the center of the drum, in which the drum is rotated for radial scanning through the slot in the diaphragm and the drum and the diaphragm and slot are revolved bodily around the center of the scanning axis to progressively change the direction of the radial scan to progressively cover a circular field of scan.

A still further object is the provision of means for rotating the scanning drum on its axis at a predetermined ratio to the rate of bodily rotative displacement of the drum and slotted diaphragm about the scanning axis.

A further object is the provision of means for adjusting the length of the scanning slot in the diaphragm to control size of the field of scan.

A further object is the provision of a simple form of scanning means having a rotary scanning drum with a plurality of radial infrared radiation transmitting spoke members, journaled on an axis perpendicular to the scanning axis at one side thereof and means for simultaneously rotating the drum on its axis and revolving the drum bodily about the scanning axis.

A further object is the provision of a scanning head mounted on a dirigible support for rotation on the scanning axis, the head having a lens means therein to produce a real target image plane, a diaphragm across the image plane having a radial scanning slot therein and a rotary scanning drum having an axis perpendicular to the scanning head axis, in rear of the diaphragm, perpendicular to the scanning slot, intermediate the ends of the slot, in which the drum is provided with transparent radial scanning quartz spoke members movable in successive radial scans longitudinally of the slot in the diaphragm from the scanning axis to one side of the image plane of the lens means, and means for rotating the head, diaphragm, and the drum about the scanning axis at a predetermined ratio, and rotating the drum on its axis at a different ratio.

A further object is the provision of an infrared scanning means which can be made small, compact and simple, and capable of accurate scanning over a comparatively large field of scan.

A still further object is the provision of an infrared radiation responsive scanning apparatus in which the sensitivity of the apparatus is not affected by variations in temperature of a scanning window closure through which the scanning is accomplished.

Another object is the provision of scanning means having two rotary scanning motions in relatively perpendicular axes and means for selectively scanning a normal circular field of scan at a predetermined rate or a smaller circular field of scan at a different predeterimned rate.

Like reference characters refer to like parts in the several figures of the drawings in which.

Figures 1, 3, 4:
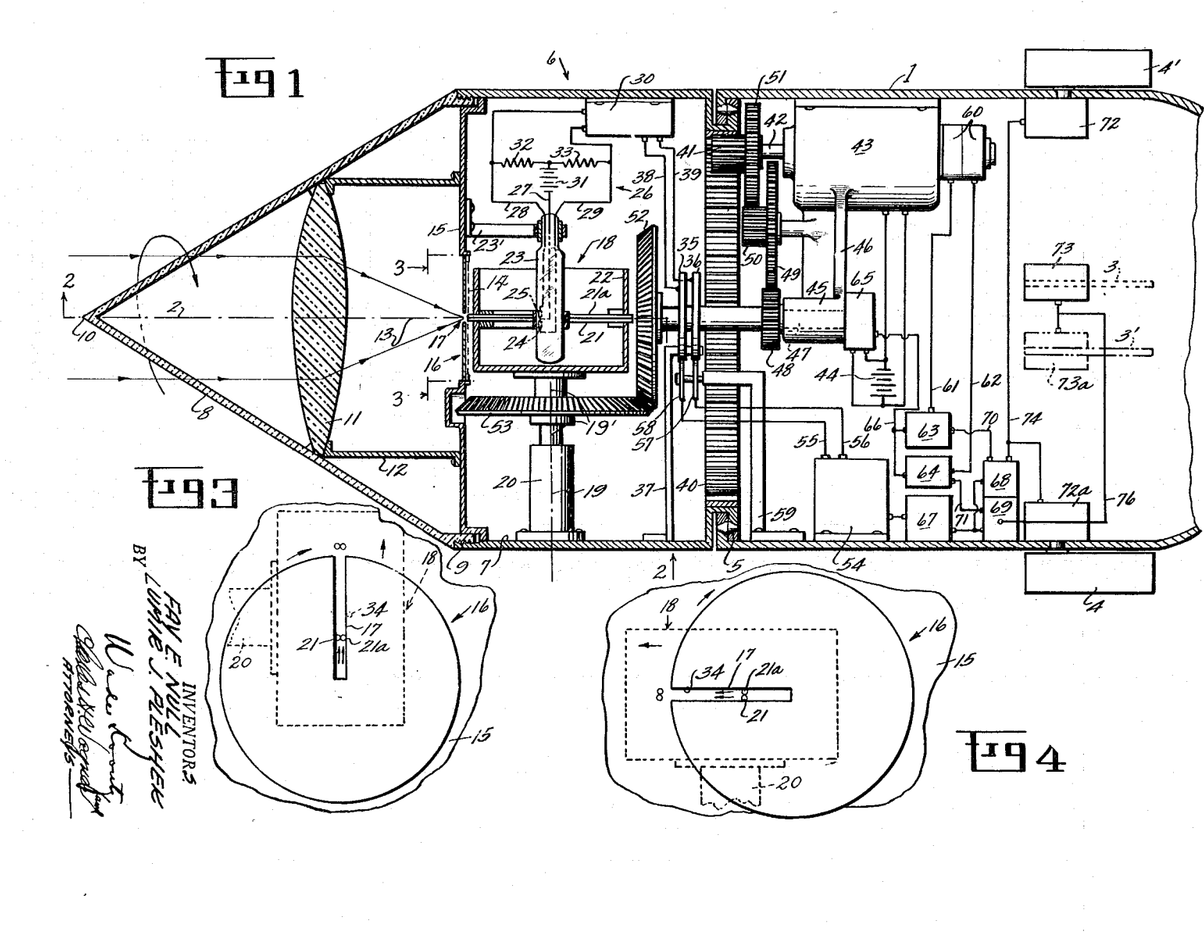
Figure 1 is a fragmentary vertical longitudinal sectional view through a dirigible vehicle, such as a guided missile, somewhat diagrammatically illustrating our improved infrared radiation responsive scanning means and steering control apparatus applied thereto, parts being broken away and shown in section.
Figures 3 and 4 are fragmentary vertical sectional views taken approximately on lines 3—3 of Figure 1 with the scanning head rotated to different angular positions around the scanning axis.

Referring to Figure 1 of the drawings the reference numeral 1 denotes a dirigible support, such as a "guided missile" having a central scanning axis 2 and X and Y coordinate direction steering control means 3, 3' and 4, 4' such as rudder and elevator means for steering the support in X and Y coordinate directions or in azimuth, and in elevation. The support 1 is preferably stabilized around its longitudinal or scanning axis 2 in the usual manner, such as by gyroscope means operating to control servomotors which control the actuation of the fins 3, 3' and 4, 4', this mechanism being omitted since it is well known.

Rotatably journaled on the support 1 on suitable annular bearings 5 is a rotary scanning head 6 comprising a cylindrical casing or barrel 7 having a transparent conical nose or infrared radiation passing window 8 fixed in its forward end at 9 the window tapering forwardly with its apex 10 located on the scanning axis 2. The window is comparatively thin and will pass infrared radiation from a selected distant heat source or target located forwardly of the window in the scanning field of the head.

An infrared radiation focusing lens member 11 is fixed in the rotary scanning head on the brackets 12 and located behind the window 8 with its optical axis 13 coincident with the central scanning axis 2. The lens has an infrared target real image focusing plane 14 located on the rotary head perpendicular to the scanning axis between the lens member and the support, in which infrared radiation from the heat of a distant suitable target is brought to focus by the lens member 11. This real image plane 14 is perpendicular to the scanning axis 2, and, of course, the real image plane surrounds the optical axis 13 perpendicular thereto.

A partition 15 extends across the front of the casing 7, preferably forwardly of the real image focal plane and is provided with an infrared radiation blocking diaphragm 16 located intermediate the lens 11 and the real image plane 14, preferably as close to the image plane 14 as possible. The diaphragm covers the maximum circular area of scan focused on the image plane 14 and is fixed relative to the head, perpendicular to the scanning axis 2 and optical axis 13 and is formed with a narrow radial scanning slot or slit 17 extending outwardly from the central scanning axis 2 to the edge of the maximum field of scan on the real image plane, that is, as shown, to the periphery of the diaphragm 16.

A rotary scanning drum 18 is rotatably journaled on said rotary scanning head in rear of the diaphragm 16 on an axis 19 located at one side of the scanning axis 2 in a plane perpendicular to the scanning axis 2, and spaced from the image plane 14 a distance slightly exceeding the radius of the scanning drum 18.

The scanning drum is mounted on a drive shaft 19' which is journaled in suitable bearing means 20 fixed to the rotary scanning head. Said drum axis 19 is perpendicular to the center line of slot 17 and parallel to the diaphragm 16 in a plane which intersects said slot perpendicularly at substantially the mid point of its length. Scan spokes 21 and 21a are perpendicular to said axis 19 and attached to said drum at such a point on axis 19 as to rotate in adjacent planes containing the center line of said slot 17. Said placement of axis 19 insures that the distance between the circular paths swept out by the ends of spokes 21 and 21a and said slot 17 shall be symmetrical and a minimum average value.

A plurality of pairs of infrared radiation transmitting spokes, such as quartz spokes or rods 21 and 21a are suitably fixed in a rim 22 of the drum 18 in side-by-side juxtaposed relation. Each pair of spokes 21 and 21a constitute a scanning spoke member extending in a direction radially from the axis of the drum to a point slightly beyond its periphery, the spoke members being uniformly spaced around the periphery of the drum with their outer extremities disposed to successively scan through the real image plane 14, in a plane perpendicular to the drum axis 19, passing through the longitudinal axis of the slit 17 radial to the scanning axis 2 when the drum is rotated, the space between the outer ends of the adjacent spoke members being substantially equal to the length of the slit 17 so that only one spoke member at a time can scan the portion of the real image focal plane which is exposed through the scanning slot 17. As shown in the preferred form of the invention only six pairs of radial spokes are provided but obviously a greater or lesser number of spoke members and a correspondingly different length slit 17 can be employed. The inner ends of the spoke members are radially spaced from the central axis 19 of the drum to receive an infrared radiation responsive means or photo cell member 23 therebetween preferably supported in the head 6 by a bracket 23'. The photo cell 23 is provided with two side-by-side infrared radiation responsive elements 24 and 25. The cell element 24 being located in the plane of rotation of the spokes 21 while the cell 25 is in the plane of rotation of the spokes 21a. The photocells as shown are disposed adjacent the rear or inner ends of the twin spokes and are illuminated or energized thereby as the outer ends of the spokes traverse the slit 17 in the diaphram 16 in scanning the target image in the image focal plane. A suitable differential output circuit 26 connects the photo cell leads 27, 28 and 29, to an amplifier 30 so that the voltage output from the two cells of the photo cell are bucked against each other by the circuit of battery 31 and resistors 32 and 33 and the difference in the potential or drop across resistors 32 and 33 is impressed on the amplifier 30, the amplifier furnishing the same polarity of output signal regardless of the input polarity.

In supersonic flow the tip or apex portion of the conical window 8 will be hotter than the base portion. With a drum having a single radial spoke arrangement the tips of the spokes would not only receive radiation from the target image in the image plane exposed through the slit 17 but would also receive unfocused radiation from the window 8 that would be greater at the start of the radial scan (pointing toward the tip 10 of the cone) than at the end of the radial scan (pointing toward the base of the cone). In this case a false signal would be received from the conical window. By bucking the outputs of the photo cell elements energized by the quartz rods 21 and 21a against each other these window background signals would cancel out.

As shown in Figure 4, however, one of the rods or spokes 21, 21a strikes the infrared target image 34 before the other spoke of 21, 21a, and the signal is transmitted to the amplifier 30. The output of the amplifier 30 is connected to the slip rings 35 and 36, fixed coaxial with the scanning axis 22 on a bracket 37 fixed to the casing 7, by the conductors 38 and 39, of course, insulated from the brackets 37 and from each other.

The head 6 has an internal ring gear 40 disposed in meshing relation with a pinion 41 keyed to a drive shaft 42 from a motor 43 carried by the main or dirigible support 1, and driven, preferably at a constant or uniform speed by a battery or other current source 44. The motor constitutes driving means for rotating the scanning head 6 about the scanning axis 2 and also rotating the scanning drum 18 on its axis 19.

A suitable shaft bearing 45 is bracketed on the main support 1, from the motor frame by a bracket 46, in which is journaled a drive shaft 47 for rotating the scanning drum 18. The shaft 47 has a drive pinion 48 fixed thereon which meshes with a gear train comprising an idler gear and pinion 49, 50, the gear 49 meshing with the pinion 48 while the pinion 50 meshes with a larger gear 51 fixed on the motor shaft 42.

The forward end of the drive shaft 47 extends through the slip rings 35 and 36 in insulated relation thereto and has fixed thereon a hypoid gear 52 which meshes with a second hypoid gear 53 fixed to the shaft 19 spaced at one side of the scanning axis 2 and carrying the scanning drum 18.

Figures 5, 8, 10, 11:
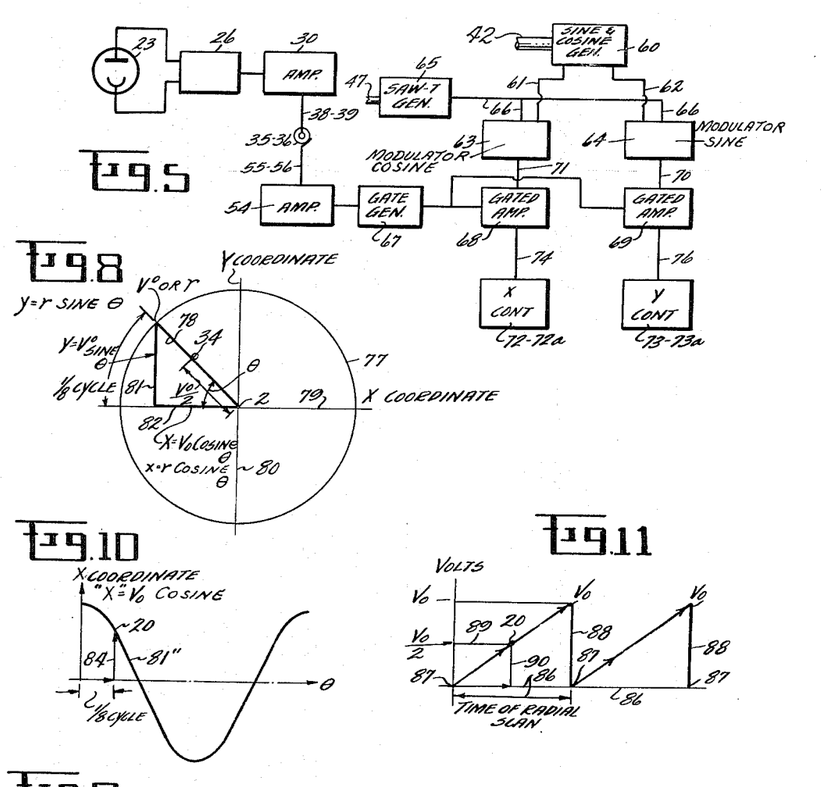
Figure 5 is a block diagram illustrating the control circuits.
Figure 8 is a diagrammatic view illustrating the scanning field of the real image plane and the position of an infrared radiation target image thereon relative to the sine and cosine curves and X and Y coordinate positions as related to the angular position of the scanning slot.
Figure 10 is a similar view, but illustrating the relation of the cosine wave curve of the position of the scanning slot, spokes and the Y coordinate.
Figure 11 is a diagrammatic view illustrating several of the saw-tooth waves and the relative position of a target image thereto in the line of radial scan of the scanning drum, as disclosed in the position shown in Figure 8.

Located within the main support or casing 1 is a main amplifier 54 for amplifying the output from the amplifier 30, electrical input conductors therefor, indicated at 55 and 56, as seen in Figs. 1 and 5 are connected to brushes 57 and 58 carried by a bracket 59 fixed to the main support 1, the brushes 57 and 58 being in sliding contact with the slip rings 35 and 36.

A two phase sine and cosine wave electrical generator 60 is connected to the motor shaft 42 to be driven thereby in synchronized relation to the rate of rotation of the scanning head 6, generating sine and cosine waves delivered through electrical conductor means 61 and 62 to sine and cosine wave amplitude modulators 63 and 64 respectively. Suitable speed reduction means may be provided between the motor shaft 42 and the two phase generator 60 so as to generate one sine wave or cycle during one rotation of the head 6 with its plus and minus peaks located in the X coordinate direction or horizontal plane, and one cosine wave, 90° out of phase, or with its plus and minus peaks in the Y coordinate direction or vertical plane.

In order to provide a radial scan control signal, reference being made to Figs. 1 and 5, a saw-tooth wave generator 65 is provided and suitably connected or geared to be triggered by the drive means for the scanning drum 18, such as by the end of the drive shaft 47, to generate a saw-tooth wave for each radial scan of each of the spoke members across the portion of the image field 14 exposed through the slit aperture 17, each saw-tooth wave commencing at the beginning of each radial scan of a spoke member with the output potential increasing to the cut off point immediately prior to the beginning of the succeeding spoke scan. If the scanning drum has six spokes there will be six saw-tooth waves generated per each rotation of the drum 18, while if twelve spokes are also provided as in the modification shown in Figure 6 a second saw-tooth generator is also provided, driven by the same shaft, which can be substituted in the saw-tooth control circuit when a twelve spoke scan is employed.

Fig. 5 illustrates the method of obtaining output guidance signals proportional to the X and Y components of a target position in the scanned field of view. The infrared detector 23 is connected to the bias voltage and signal pick-off circuit 26 as shown in Fig. 4. When the slot 17 rotates over the target image in the real image of the scanned field on focal plane 14 and the quartz spokes 21 or 21a pass over the target image and conduct radiant energy from said image to one of the detector elements 25 or 24 of cell 23, the "bucked" IR drops across resistors 32 and 33 will no longer cancel and a signal will be transmitted to the preamplifier 30 through slip rings 35—36, along leads 55—56 to the main amplifier 54. The output of amplifier 54 trips the gating means 67 which impresses a positive voltage pulse on the control grids of gating tubes in the gating amplifiers 68 and 69 which at that instant sample the voltages on leads 71 and 70, allowing voltage pulses to pass along leads 74 and 76 to missile control signal leads 72—72a for azimuth guidance at 73—73a for elevation guidance. The signal voltages received from leads 70 and 71 must thus have instantaneous values proportional to the X and Y components of the target position at the instant the target signal occurs.

The generation of the above comparative voltages is illustrated in Figs. 8, 9, 10, and 11. In Fig. 8 the vector 78 rotates at the same angular speed as the head 6 and therefore represents the rotation of the slot 17 over the scanned field of view 77. As line 78 rotates the scanning spoke pair 21 and 21a pass along line 78, radially outward and one of the pair passes first over the target image indicated at position 34, for instance, approximately half way out on the slot 17 represented by line 78. If a voltage $V_0$ is produced whose magnitude is proportional to the maximum radial displacement of the target from the center of the scanned field of view at 2 and whose phase is indicated by the angle $\theta$ of line 78 to the X axis and its X and Y components are proportional to the X and Y components of the target on the periphery of the scanned field of view 77. Thus the X component of the target on the circle of Fig. 8 would be given by a cosine curve $X=V$ cosine $\theta$ and the Y components by the sine curve $Y=V$ sine $\theta$. The voltage vector $V_0$ made proportional to V and rotated in phase with V in the scanned field of view and hence to the length of slot 17 in the image plane of the scanned field of view would also have components generating a cosine voltage $V_x=V_0$ cosine $\theta$ and $V_y$ respectively $=V_0$ sine $\theta$.

Figure 9:
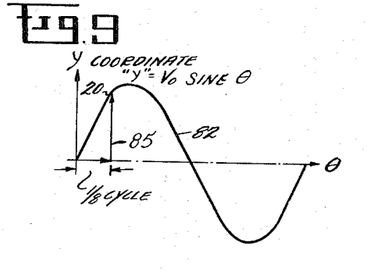
Figure 9 is a diagrammatic view illustrating the sine wave curve and the electrical values for the position of the scanning slot and spoke member relative to the X coordinate position shown in Figure 8.

If $V_0$ has a given voltage value, then $X=V_x=V_0$ cosine $\theta$ and $Y=V_y=V_0$ sine $\theta$ as represented by the successive cosine and sine waves of Figs. 9 and 10. If the target is encountered at a position 34, for instance, half way out on the vector V the value of the corresponding X and Y components will be one half that of the X and Y values for the radial displacement V. The X and Y components of the rotary voltage vector $$\frac{V_0}{2}$$

will also be one half as much as for $V_0$. Thus, to obtain a rotating voltage vector whose X and Y components are proportional to the position of the target in the field of view it is only necessary to obtain a voltage represented by a vector rotating at the same angular velocity as the slot 17, in phase with the slot rotational position, and with the magnitude equal to the radial position of the target in the scanned field of view. The proper magnitude of said rotating voltage vector may be obtained by sampling the sawtooth voltage of Fig. 11 at the instant of target detection. The sawtooth voltage is generated in synchronism with the passage of the scan spoke 21 or 21a along the radial path of line 78 with zero voltage at 2 and a maximum at the outer end of line 78. The voltage sampled from the sawtooth wave will be proportional to the radial position of the target. Thus, for a target at 34 one half of the maximum radial distance in the scanned field of view from 2, the rotating voltage vector of magnitude of $$\frac{V_0}{2}$$

would be selected. Corresponding to this case the value of the output of the sawtooth generator 65 at the instant of target detection would be $$\frac{V_0}{2}$$

and would be impressed on the leads 66 to the X and Y modulators 63 and 64 (such as for instance on one grid of a double grid vacuum tube in each of the modulators). The effective rotation of vector voltage, in this case the selection of a detected voltage $$\frac{V_0}{2}$$

impressed on modulators 63 and 64 is obtained for instance by impressing the sine wave on the second grid of the double grid tube in the modulator 64 and a cosine wave on the second grid of the modulator 63 which are, of course, in phase with the X and Y components of the radial length of rotating slot 17 as represented in Figs. 10 and 9. Thus, the voltage output from the sawtooth generator which is represented by the radial position of the target at the instant of target detection is multiplied by the output of a cosine wave generator in modulator 63 and by a sine wave generator in modulator 64 to obtain voltages respectively equal on a given sector to the X and Y components of the target position in the scanned field of view 77.

Since the power output potential from the amplifier 54 in Figures 1 and 5, controlled by the photo cell 23 actuates the gate 67 which opens gates 68 and 69 simultaneously and the X coordinate steering means is under control of the X coordinate gating means, which in turn receives a voltage proportional to the cosine wave as modulated by the saw-tooth wave through the sine and saw-tooth wave modulator, and the Y coordinate steering means 73—73a is under the control of the Y coordinate gating means which in turn receives a voltage proportional to the sine wave modulator output, it will be seen that the position of the head, slot, and position of the infrared receiving end of the spoke member during its scan, relative to the position of the target image on the real image plane is coordinated precisely relative to the X and Y coordinates and scanning axis, and the steering means are actuated accordingly relative to the exact position of the target image spot on the image plane or field for steering the dirigible body accordingly.

Figure 2:
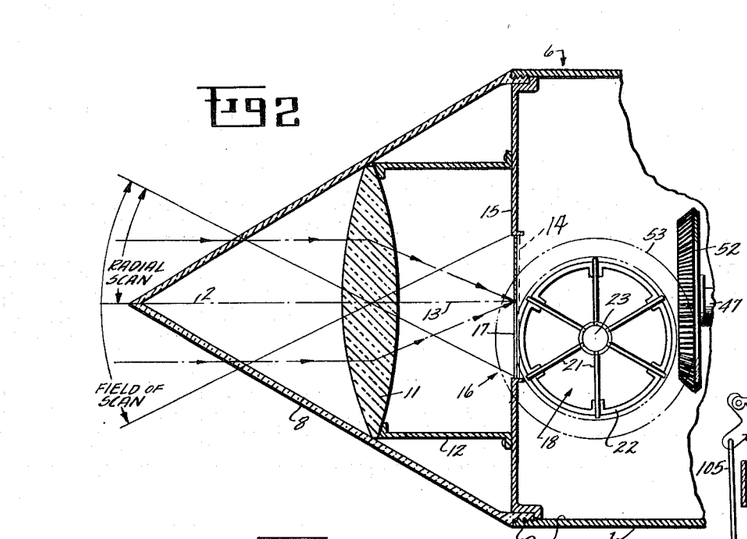
Figure 2 is a fragmentary longitudinal sectional view taken approximately on the plane indicated by lines 2—2 in Figure 1.
Figure 6:
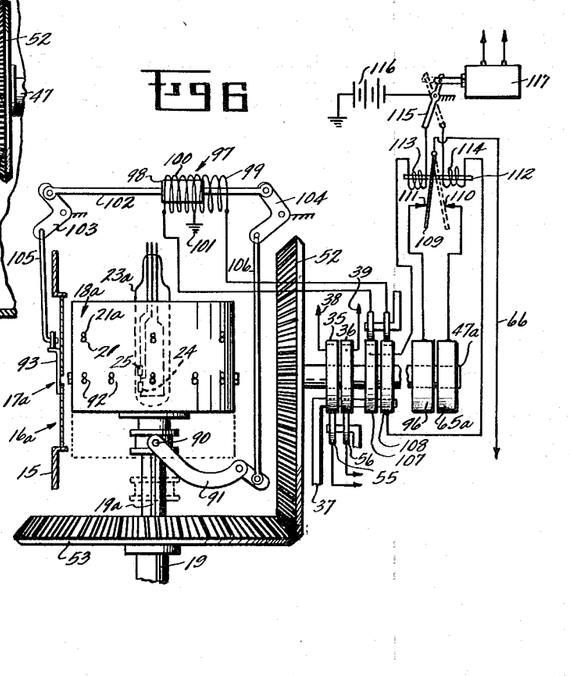
Figure 6 is a fragmentary vertical sectional view through a portion of the scanning head diagrammatically illustrating a modified embodiment for selectively providing a normal and narrow field of scan.

Referring to Figure 6 of the drawings, a modification of the invention is shown somewhat diagrammatically, in which means are provided for displacing the scanning drum axially relative to the scanning slot to selectively present a greater or lesser number of quartz spokes to the image plane 14. Simultaneously the length of the scanning slot 17a is adjusted to correspond with the distance between the ends of the selected group of scanning spokes 92. Since the scanning mechanism generally is identical with the construction shown in Figures 1 and 2 except for the shifting mechanism and an additional sawtooth wave generation means, reference characters relating to similar parts or elements shown in Figures 1 and 2 will be indicated by similar reference characters in Figures 6 and 7. The scanning drum indicated at 18a is mounted on the drive shaft 19a on a spline bearing 90 and a shifter yoke 91 is provided for shifting the scanning drum axially relative to the infrared radiation responsive cells 24 and 25 of the photo cell means 23a. The drum 18a is provided with a first set of scanning spoke members similar to those shown in Figure 1 and indicated at 21 and 21a and a second set of spoke members 92 in a spaced plane parallel to the plane containing the spokes 21 and 21a, the second set being greater in number than the set of spokes 21 and 21a. As shown in the drawings the second set of spoke members 92 contain twice the number of the first set 21, 21a and the drum is axially shiftable by the yoke member 91 to selectively present either set of the spoke members into the plane of the scanning slot 17a in the radiation blocking diaphragm 16a. A shutter member 93 is pivoted on the diaphragm 16a at a suitable point, indicated at 94 in Figure 7 and is shiftable between a dotted line position 95, out of the slit opening 17, and the position shown in full lines, reducing the length of the scanning opening to that equal to the space between the ends of the adjacent spoke members 92 in Figure 6.

Triggered by the drive shaft 47a for the scanning drum, are two saw-tooth wave generators 65a and 96. The saw-tooth wave generator 65a is similar to saw-tooth generator 65 in Figure 1 and used with the group of spoke members 21 and 21a, while the second saw-tooth wave generator 96 is used in connection with the second group of scanning spokes 92.

Any suitable type of actuating means for simultaneously shifting the scanning drum to provide the relatively rapid or slower scan, and shifting the shutter 93 correspondingly to adjust the length of the scanning opening may be provided. As shown in the drawings, a solenoid actuator 97 is provided having an armature 98 and coils 99 and 100, grounded at 101, the armature 98 being fixed on a shifter rod 102 and connected through bell cranks 103, 104 and links 105, 106 to the shutter 93 and shifter yoke 91 respectively. Slip rings 107 and 108, similar in construction and mounting to the slip rings 35 and 36 shown in Figure 1, are provided for establishing circuit connections between the solenoid 97 in the head 6 and the coils 113 or 114 as determined by the position of switch 115 in the main or dirigible support 1. A double throw switch 109 is provided to make contact with one or the other output terminals 110 or 111 of the saw-tooth wave generators 65a and 96. Switch 109 carries an armature 112 and is actuated by selectively energizing one or the other of the magnets 113 or 114 to connect either of the saw-tooth wave generators through conductor 66 to the sine wave and cosine wave modulators not shown similar to the sine and cosine modulator devices 64 and 63 shown in Figure 1. A switch 115 is provided for selectively energizing the magnets 113 or 114 and the solenoid coils 99 or 100 through the battery 116. Any suitable means may be provided for shifting the switch 115 when it is desired to scan a narrower field, such as a double throw solenoid 117 operated by amplifier 54 when a reference signal intensity is reached as the missile approaches the target. The target is first picked up at maximum range where sensitivity is required. Detector cells have the characteristic response such that for maximum sensitivity the scan rate must not exceed a given value. Hence, the target is first picked up with a slot scan. Because of the inverse square law the target signals increase rapidly with decrease in range. Thus as the missile approaches the target the signal is still large enough to operate the controls when a more rapid scan is used. This provides many more signals per second for servo control with greater accuracy in tracking. To change from rapid to slow scanning, it is only necessary to adjust the sensitivity of the switching relay circuit, for example a conventional resistance could be employed so that the relay operates for a preset strength of target signal as amplified on the output of 54, this signal being strong enough to operate the guidance circuits satisfactorily at the more rapid rate of scan.

Figure 7:
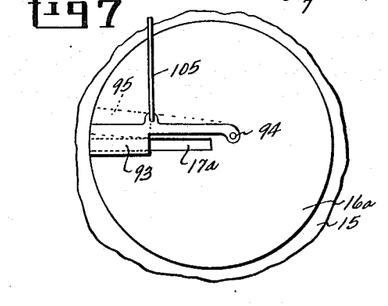
Figure 7 is a fragmentary plan view of the scanning diaphragm, illustrating means for shortening the effective length of the scanning slot.

In the operation of the modified form it is preferable to start the scan with the drum 18a and the shutter 93 shifted to the wide scan positions shown in dotted lines in Figures 6 and 7. This provides a greater scanned area for initially picking up the infrared radiating target. Once the target has been located and the direction of the dirigible support 1 has been changed to bring the target closer to the center of the field of scan, the circuit to the solenoid 117 is closed to shift the switch 115 to the position shown in full lines. This actuates the switch 109 to disconnect the saw-tooth generator 65a and connect the saw-tooth wave generator 96 to the modulator devices 63a and 64a. Simultaneously the solenoid coil 100 is energized to shift the shutter 93 across the outer half of the scanning slit 17a, and move the drum 18a axially to the position shown in full line in Figure 6 providing a smaller and more concentrated field of scan around the scanning axis and simultaneously a faster rate of scanning.

While we have illustrated a specific embodiment of the invention it is obvious that various changes and modifications of structure may be made without departing from the spirit of the invention as defined in the following claim.

We claim:

1. Scanning means for control mechanisms responsive to radiant energy comprising a main support having a scanning axis and adapted to contain radiant energy responsive means; a rotary scanning head journaled on said main support for rotation on said scanning axis; radiant energy focusing lens means fixed on said scanning head having an optical axis concentric with said scanning axis and a radiant energy image focal plane in said scanning head surrounding the scanning axis substantially perpendicular thereto; a rotary scanning member journaled in said scanning head for rotation on an axis at one side of said scanning axis, perpendicular to said scanning axis and spaced rearwardly from said image focal plane in parallel relation to said image focal plane; radiant energy responsive means fixed in the rotary scanning head substantially at the center of said rotary scanning member; a plurality of radiant energy transmitting spoke members uniformly spaced around the periphery of said rotary scanning member extending radially from the axis thereof in a radial plane passing through said scanning axis, said spoke members having their inner ends surrounding said radiant energy responsive means in spaced relation to each other in a plane perpendicular to said scanning member axis passing through said radiant energy responsive means and their outer ends disposed to sweep said real image plane, in substantially radial planes through the scanning axis; radiant energy blocking diaphragm means fixed in said rotary scanning head and surrounding said scanning axis substantially perpendicular thereto intermediate the periphery of the rotary scanning member and said image focal plane for shielding a portion of the radiant energy from said lens means to said image focal plane, said diaphragm having a radial scanning slot therethrough substantially equal in width than the width of said spoke members, extending outwardly from said scanning axis toward the periphery of said diaphragm with the opposite side edges of said slot disposed in parallel planes at opposite sides of the path of travel of the spoke members during rotation of said scanning member; power drive means intermediate said main support and rotary scanning head for rotating said rotary scanning head on said support at a uniform rate; and positive drive means intermediate said rotary scanning head, said power drive means, and said rotary scanning member for rotating said rotary scanning member on said rotary scanning head at a predetermined ratio to the said rate of rotation of said rotary scanning head on said main support.

2. In an infrared radiation responsive scanning device, a main support having a scanning axis, rotary scanning head carried by said main support for rotation on said scanning axis comprising infrared radiation focusing lens means having an optical axis coextensive with said scanning axis and an infrared image focal plane perpendicular to said scanning axis; an infrared radiation image blocking diaphragm fixed in said rotary scanning head surrounding said scanning axis perpendicular thereto intermediate the lens means and said image focal plane, said diaphragm having a radial slit aperture therein extending outwardly from said scanning axis; a rotary scanning drum journaled for rotation on said rotary scanning head on an axis perpendicular to said scanning axis at one side thereof in a plane parallel to said image focal plane and spaced rearwardly thereof, a distance substantially equal to the radius of said scanning drum, a plurality of infrared radiation transmitting spoke members fixed in said scanning drum and extending radially outwardly from the rotary axis thereof substantially perpendicular to said rotary axis, said spoke members having their outer extremities disposed to successively scan the portions of said real image focal plane exposed through said slit aperture when said drum is rotated; infrared radiation responsive means fixed in the center of said drum and surrounded by the inner ends of the spoke members, power means carried by said main support, drivably connected to said rotary scanning head and said scanning drum to simultaneously rotate said rotary scanning head and turn the diaphragm and said drum about said optical axis at a uniform rate and rotate said drum on its axis at a different relatively uniform rate to successively pass the outer extremities of the spoke members through the portion of said image plane exposed through said slit aperture as the scanning head and drum rotate to progressively scan said image plane and transmit infrared radiant energy received in said image plane through said spoke members to said infrared radiation responsive means; and means carried by said main support electrically connected to said infrared radiation responsive means to be selectively energized thereby proportionally to the angular rotation of said head and radial scanning position of said spokes in the image plane exposed by said slit aperture.

3. An infrared radiation scanning means for a dirigible vehicle control apparatus responsive to infrared radiation comprising; a dirigible support having a scanning axis; steering means for said vehicle; a rotary scanning head journaled on said dirigible support for rotation about said scanning axis; an infrared radiation passing conical window carried by the forward end of said head having a central axis concentric to said scanning axis; infrared radiation focusing lens means positioned in the head in back of said conical window having an optical axis concentric to said scanning axis and an infrared radiation real image focal plane surrounding said scanning axis perpendicular thereto; an infrared image blocking diaphragm fixed in said head across said image focal plane to prevent infrared radiation passing through said window and lens means from reaching said image focal plane, said diaphragm having a narrow substantially uniform with radial scanning slot therein having its center line extending radially outwardly from the scanning axis toward the periphery of the image plane; a rotary scanning drum rotatably journaled in said scanning head in rearwardly spaced relation to said image focal plane on an axis extending perpendicular to said scanning axis and perpendicular to the longitudinal center line of said slot aperture, substantially parallel to said image focal plane and spaced rearwardly thereof, a distance substantially half of the diameter of said drum, said drum having a central longitudinal opening therein; infrared radiation responsive means relatively fixed within said central opening of said drum; infrared radiation transmitting spoke members fixed substantially radially in the drum in uniform circumferentially spaced relation to each other with their inner extremities disposed to progressively pass said infrared radiation responsive means with their outer extremities uniformly spaced around the periphery of the drum to progressively sweep and scan said image plane between the opposite longitudinal edges of said elongated slot in said diaphragm during rotation of said drum; a motor fixed in said dirigible support; differential speed driving means connected between said motor, said scanning head and said scanning drum for simultaneously rotating said scanning head on said support, and rotating said scanning drum on its axis at a predetermined ratio to the rate of rotation of said scanning head on said scanning axis; and electrical control means interconnected between the infrared radiation responsive means and the steering means, responsive to variations in infrared radiation in pretermined portions of said image plane progressively exposed through said slot during the simultaneous rotation of said scanning head on said dirigible support and rotation of said scanning drum and scanning movement of the outer extremities of said spoke members through the portion of said image focal plane progressively exposed through said slot during rotation of said rotary drum in said scanning head and rotation of said scanning head on said dirigible support.

4. Apparatus as claimed in claim 3 including a second set of uniformly spaced radial scanning spoke members fixed in said scanning drum in a plane parallel to the plane containing the outer ends of said first spoke members, said second set including a greater number of spokes than the number of the first mentioned spoke members, means for axially adjusting the position of said scanning drum relative to the radiation responsive means and center line of said slot to position the second set of spoke members with their outer ends scanning relation to said image plane intermediate the opposite side edges of said scanning slot and their inner ends adjacent said infrared radiation responsive means, and shutter means movable across said slot to reduce the effective length of said scanning slot to correspond substantially to the distance between the outer extremities of two adjacent radial spokes of said second set of spoke members.

5. An infrared radiation scanning means for a dirigible vehicle support having a scanning axis, steering means carried by said support for steering said support in an X coordinate direction through said scanning axis in one plane; steering means carried by said support for steering said support in a Y coordinate direction perpendicular to said X coordinate direction; a scanning head journaled on said support for rotation concentrically about said scanning axis; an infrared radiation focusing lens member fixed in said scanning head having an optical axis concentric to said scanning axis and an infrared radiation real image focal plane extending across said scanning axis substantially perpendicular thereto intermediate said lens member and said support; a conical infrared radiation passing window fixed to said scanning head and tapering forwardly therefrom and inclosing said lens means and said image plane with its axis concentric to said optical axis; infrared radiation blocking diaphragm fixed in said scanning head intermediate said lens member and said image plane in substantially adjacent parallel relation to said image plane, said diaphragm having an elongated substantially radial slot therethrough with its inner end substantially at the scanning axis and its outer end at the periphery of said diaphragm; a spoke carrier drum member journaled for independent rotation in said scanning head on an axis perpendicular to said scanning axis, intersecting the radial slot aperture perpendicular to its center line substantially midway between its ends and in an intersecting second plane substantially parallel to the image focal plane, located intermediate the image focal plane and said dirigible support; a plurality of infrared radiation transmitting radial spoke members fixed in said scanning drum member and extending outwardly from the axis of said scanning drum member in equal circumferentially spaced relation to each other around the periphery of said drum member in a plane through said scanning axis located intermediate the longitudinal side edges of the radial slot aperture with the inner ends of said spoke members terminating in radially spaced relation to said scanning drum axis and their outer ends located to sweep said image plane; infrared radiation responsive photo cell means fixed in said sacnning head substantially at the center of said scanning drum adjacent the inner ends of said spoke members; an energizing electrical circuit having an electrical output; a motor carried within said dirigible support and connected in said circuit; positive drive means between said motor and said head for rotating said head on said support; drive means between said motor and said drum for simultaneously rotating said drum on its axis at a predetermined greater rate relative to the rate of rotation of said head; an electrical amplifier energized by said photo cell means for amplifying the intensity of the infrared signals received by said photo cell means, a two-phase sine and cosine electrical wave reference generator carried by said support; positive driving means between said generator and said motor for operating said generator in phase with the rotation of said head; a sawtooth wave electrical generator; means connected for operating the sawtooth wave generator in phase with the successive sweeps of said outer extremities of said spoke members through said image plane exposed through said slot in said diaphragm, a sine wave modulator connected between said two-phase sine and cosine wave generator and said sawtooth wave generator, a cosine wave modulator connected between said two-phase sine and cosine wave generator and said sawtooth wave generator, a sine wave electrical gating means connected between the amplifier output and said sine wave modulator to control electric energy between said modulator and one of said X and Y coordinate direction steering means; and a cosine wave electrical gating means connected between the said amplifier output and said cosine wave modulator to control electrical energy between said modulator and the other of said X and Y coordinate direction steering means.

6. In an infrared radiation rotary scanning apparatus, a dirigible support having scanning axis, a sine wave modulator carried by said support, a cosine wave modulator carried by said support, a sawtooth wave electrical generator carried by said support and connected to the sine and cosine wave modulators for simultaneously feeding a sawtooth electrical wave into each of said sine and cosine wave modulators; a two-phase sine and cosine wave electrical generator carried by said support and connecting said sine wave and cosine wave modulators for simultaneously feeding a sine wave potential into said sine wave modulator and a cosine wave potential into said cosine wave modulator, infrared radiation responsive photocell means having an energizing circuit and an electrical output proportional to infrared radiation received by said photo cell means; an electrical amplifier connected to the photo cell output to amplify the electrical output therefrom; a first electrical power operated steering means carried by the support for steering the support in one radial plane through said scanning axis; a second electrical power operated steering means carried by the support for steering the support in a second radial plane through the scanning axis perpendicular to said first radial plane; independent electrical energizing circuits connected between said first and second power operated steering means and said respective sine and cosine wave modulator outputs for selectively supplying electrical potential to both of said steering means for selective actuation thereof; electrical current gating means intermediate said modulators and each of said steering means, one of said gating means having an electrical control circuit therefor connected to the output of said sine wave modulator device and the other of said gating means having a control circuit therefor connected to the output of said cosine wave modulator devices for selectively controlling the energizing currents to said two steering means proportional to the sine and cosine waves of said two phase generator and proportional to the amplitude of the current from said sawtooth wave current generators; a scanning head rotatably journaled on said support for rotation on said scanning axis; a conical shaped infrared radiation passing window fixed on said scanning head having its apex projecting forwardly concentric to said scanning axis; an infrared radiation focusing lens member fixed in the head behind the window having an optical axis concentric to the scanning axis and a real infrared image receiving focal plane located intermediate said lens means and said dirigible support, perpendicular to said scanning axis; an infrared radiation blocking diaphragm fixed in said rotary head across said image plane between said image plane and said lens means, said diaphragm having an elongated radial scanning slit therethrough, one end of said slit terminating at the scanning axis and the opposite end terminating adjacent the outer edge of said diaphragm; a scanning drum journaled for rotation in said head on an axis perpendicular to said scanning axis at one side thereof in a plane parallel to said scanning axis and perpendicular to said radial slit, intersecting the center line of the slit substantially midway between its ends; photo cell means fixed in said scanning head centrally within said drum; a plurality of radial infrared radiation transmitting spoke members fixed in the drum in equally spaced radial relation around said drum axis and surrounding said photo cell means in a plane passing through the scanning axis intermediate the opposite side edges of said slit, said spoke members having their inner ends disposed in juxtaposed traversing relation to said photo cell means when the drum is rotated, with the outer extremities of said spokes in juxtaposed successive scanning relation to said image plane during rotation of the drum; an electrical motor fixed in the support for rotating said drum and said head, including drive means between said motor and said head for rotating said head on its axis; drive means between said motor and said drum for rotating said drum on said head on its axis at a predetermined ratio to the rate of rotation of said head, and drive means connected between said motor, said two-phase sine cosine wave generator, and said sawtooth wave generator for actuating said two-phase sine cosine wave generator and said sawtooth wave generator respectively at a predetermined ratio in phase with the rate of rotation of said head on said support and, successive scanning passes of the outer ends of said spoke members through said image plane of said lens means progressively exposed through said slit in said diaphragm during rotation of said head and said drum.

7. In a radiant energy scanning device for guided missiles having a dirigible support and a scanning axis; steering means carried by said support for selectively controlling the direction of said missile in an X coordinate direction through said axis; steering means carried by said support for selectively controlling the direction of the missile in a Y coordinate direction through said axis perpendicular to said X coordinate direction; a rotary scanning head journaled on the forward end of said support for concentric rotation about said scanning axis; a radiant energy focusing lens fixed in said rotary scanning head having an optical axis concentric with said scanning axis and a radiant energy real image focal plane perpendicular to said scanning axis, intermediate said lens and said support, an opaque radiant energy blocking diaphragm fixed on said head, across said image focal plane having a narrow scanning slot therethrough extending substantially radially from the scanning axis toward the periphery of said image plane, a rotary scanning drum journaled in said head for rotation on an axis located rearwardly of said diaphragm, perpendicular to the scanning axis at one side thereof and in a plane intersecting the slot aperture substantially perpendicularly midway between the ends of the slot aperture; radiant energy responsive photo cell means fixed in said rotary scanning head substantially at the center of the drum in a radial plane from said scanning axis passing through said slot aperture intermediate its side edges, a plurality of pairs of juxtaposed side-by-side parallel radiant energy conducting spoke members fixed in said drum in equally spaced relation to each other around the periphery of said drum in radial planes with their inner ends facing toward said drum axis in radially spaced relation to said photo cell means and their outer ends disposed to scan said image focal plane between the side edges of said slot at opposite sides of the center line of the slot when the drum is rotated; said photo cell means comprising a pair of side by side radiant energy responsive photo cells, one of said photo cells being located in a plane perpendicular to said drum axis extending through the inner ends of one set of said side-by-side spoke members and the other photo cell located in a second plane perpendicular to said drum axis passing through the inner ends of the other set of said side-by-side spoke members; motor drive means carried by the support; drive means between said motor drive means and said head for revolving said head on said scanning axis; positive drive means between said motor and said drum for simultaneously rotating said drum at a predetermined different rate from the rate of rotation of said head; a two-phase sine and cosine wave generator carried by said support; drive means between said motor and said generator for driving said generator at a rate proportional to the rate of rotation of said head; a sawtooth wave generator; drive means for actuating said sawtooth wave generator at a rate in phase with the rate of rotation of said drum: a sine wave and cosine wave modulator means electrically connected to said sine and cosine wave generators and to said sawtooth wave generator, an electrical amplifier means electrically connected to said photocell means to be energized thereby having its electrical output connected to electrically gate the sine and cosine wave modulator voltages to said X and Y coordinate direction controlling means for selective actuating thereof; and electrical amplifier means connected respectively between said sine and cosine modulator outputs and each of the X and Y coordinate direction controlling means.

8. In an infrared radiation scanning apparatus; a support adapted to move forwardly; a rotary scanning head mounted on the forward end of said support for rotation about a central scanning axis; a rotary scanning drum mounted on said head for rotation on an axis perpendicular said scanning axis at one side thereof; infrared radiation transmitting radial spoke members fixed in said drum in equally spaced peripheral relation around said drum in a plane perpendicular to said axis of said drum; each spoke member comprising a pair of juxtaposed parallel spokes located with their adjacent sides at each side of said perpendicular plane and their inner ends in equal radially spaced relation around said axis of said drum; a pair of infrared radiation responsive photo cells positioned centrally within said drum, including electric energizing circuits controlled thereby having electrical output circuits therefrom in said head, one of said photo cells being located in each of said planes on which the inner extremities of each set of said spokes is located; a pair of slip rings and electrical contact members therefor between said rotary scanning head and said support, electric conductors between said circuit for each of the photo cells and each slip ring; an infrared radiation blocking diaphragm fixed on said rotary head forwardly of said drum member and across said head substantially perpendicular to said scanning axis, said diaphragm having a narrow radial scanning slot therein from said scanning axis with its opposite side edges at opposite sides of the plane of rotation of said scanning spoke members, said slot having a width substantially equal to the width of one pair of spokes, an infrared radiation focusing lens member fixed on said head forwardly of said diaphragm, having an optical axis concentric to said scanning axis; and a real infrared image focal plane surrounding said scanning axis substantially in the path of travel of said outer extremities of the spoke members traversing said slot during rotation of said drum; and differential speed ratio driving means between said head, said scanning drum, and said support, for simultaneously rotating scanning drum on said head and rotating said head on the support at predetermined different rates.

9. In an apparatus as claimed in claim 8, a conical shaped infrared radiation passing window member fixed on said rotary head in front of said lens member and extending forwardly with its apex and longitudinal axis concentric to said scanning axis, said conical window member inclosing the forward end of said head.

10. In an infrared radiation responsive scanning apparatus for dirigible missiles, a main dirigible support having a central scanning axis and steerable in transverse X and Y coordinate directions, a rotary scanning head mounted on the front end of said support for concentric rotation on said scanning axis; a conical shaped infrared radiation passing window carried on the forward end of said scanning head tapering forwardly with its apex on said scanning axis, an infrared radiation focusing lens fixed on said head in back of said window having an optical axis concentric to said scanning axis and an infrared real image focal plane extending across said head perpendicular to said scanning axis and intermediate said lens and said support, a rotary scanning spoke carrier journaled on the head for rotation about an axis perpendicular to the scanning axis at one side thereof located rearwardly of the image plane at a distance substantially equal to the diameter of said carrier; a pair of side-by-side photo cells fixed in said head centrally within the spoke carrier adjacent rotary axis thereof immediately at opposite sides of a radial plane from said scanning axis perpendicular to said axis of said rotary spoke carrier, an energizing control circuit connecting said photo cells and output circuits therefrom, a plurality of pairs of infrared radiation transmitting radial spokes fixed in said spoke carrier with their inner ends lying in juxtaposed radially spaced relation to said carrier axis in two adjacent parallel planes at opposite sides of said radial plane; an opaque infrared radiation blocking diaphragm fixed in said head across said image focal plane intermediate said image focal plane and said lens; said diaphragm having a narrow radial scanning slot therein extending from said scanning axis toward its periphery with its center line located in the plane of movement of the outer ends of the spoke members when said spoke carrier is rotated, said photo cell controlled circuits being connected with their electrical outputs in opposition to each other to produce a differential electrical output, slip ring electrical connection means for the photo cell output circuit located intermediate said rotary head and said support; power drive means carried by said support for rotating said head on said scanning axis, and positive drive means between said power drive means and said rotary spoke carrier for rotating said spoke carrier on its axis at a predetermined ratio to the rate of rotation of said head on said support; two-phase electrical sine and cosine wave generator means connected to said power drive means to be driven thereby for producing sine and cosine voltages in phase with the X and Y coordinate positions of rotation of said head about said scanning axis; sawtooth wave generator means having a sawtooth electrical wave output synchronized to the rate of rotation of said rotary spoke carrier to generate a sawtooth wave during the passage of the outer extremities of each pair of said spoke members across the portion of said image focal plane exposed through said slot; first and second electrical gating means; means for generating constant amplitude gating pulses coincident with each output pulse of said differential photo cell output circuit; means for applying said gating pulses to said gating means; means for applying said sawtooth wave and said sine wave potential to the input of said first gating means; and means for simultaneously applying said sawtooth wave and said cosine wave potential to the input of said second gating means, whereby the voltage outputs from said first and second gating means are proportional respectively to the X and Y coordinates of the position of a real target image of the infrared radiation source on the real image focal plane as determined by the rotative simultaneous position of said scanning head and position of each spoke member in said image focal plane at the time it receives infrared radiation from an infrared target image impressed on said focal plane.

11. In an infrared radiation scanning device for dirigible missiles; a main dirigible support having a central scanning axis; means on the support for guiding the same in transverse X and Y coordinate directions; a rotary scanning head mounted on the front end of said support for concentric rotation on said scanning axis; an infrared target radiation focusing lens fixed on the front end of said head with its optical axis concentric to said scanning axis and having an infrared target radiation real image focal plane surrounding said scanning axis perpendicular thereto; an opaque infrared radiation blocking diaphragm fixed on said head across said real image focal plane intermediate the same and said lens, and formed with a narrow radial scanning slot therein extending outward from said scanning axis; a rotary scanning drum journaled on the head rearwardly of said real image focal plane on an axis perpendicular to said scanning axis at one side thereof perpendicular to the said slot, substantially midway between the ends of said slot and located rearwardly of said image focal plane a distance about equal to the radius of said drum, a plurality of pairs of radial infrared energy transmitting scanning spoke members fixed in the drum in two side-by-side parallel planes perpendicular to the axis of said drum intermediate the opposite side edges of said scanning slot compressing two juxtaposed sets of radial scanning spokes, said spoke members having outer extremities adapted to successively scan the portion of said image focal plane exposed through the slot at opposite sides of the longitudinal center line of the slot; motor driving means on said support for rotating said head on said support and simultaneously rotating said drum in said head at relative predetermined rates comprising a ring gear fixed concentrically on said head about the scanning axis, driving gear means between said motor and said ring gear for rotating said ring gear a drive shaft journaled axially within said support on said scanning axis, a driving gear train between said motor and said drive shaft, and hypoid drive gear means between said shaft and said rotary drum; a pair of infrared radiation responsive photo cells, each cell mounted intermediate the inner ends of each set of the radial spoke members; a voltage amplifier; a differential voltage output circuit connected between said two photo cells and having a differential voltage output circuit connected to said voltage amplifier input; said amplifier having an output voltage circuit connected to gate a modulated reference voltage to said X coordinate direction guiding means and a second output circuit connected to gate a modulated reference voltage to said Y coordinate direction guiding means including a first voltage amplifier output potential control gating means in said first output circuit from said amplifier; a second voltage amplifier output potential control gating means connected in said second output circuit from said amplifier; a two-phase sine and cosine wave electrical generator connected to said motor for rotation thereby in phase with the rotation of said scanning head having a sine wave output in phase with said scanning head when scanning in said X coordinate direction and a cosine wave output in phase with said scanning head when scanning in said Y coordinate direction; a sawtooth wave electrical generator connected to said motor for simultaneous actuation thereof in phase with the movement of the extremity of each pair of said spokes across the exposed portion of said real image focal plane between the inner and outer ends of said radial slot; a cosine wave modulator, connecting circuit means between said two-phase generator output, said sawtooth wave generator and said sine wave modulator for delivering a sine wave current and sawtooth wave output current to the sine wave modulator; an energizing output circuit from said first gating means to said sine wave modulator, a cosine wave modulator having an input circuit connected to said cosine wave generator and said sawtooth wave generator, and a cosine and sawtooth wave modulator current output circuit connected to said second gating means.

12. In a scanning device for infrared radiation targets; a dirigible support having a scanning axis; a scanning head rotatably journaled on said support for concentric rotation on said scanning axis comprising a cylindrical barrel; a conical shaped infrared passing window inclosing the forward end of said head with its apex on said scanning axis; infrared radiation focusing lens means fixed in said head in back of the window having its optical axis concentric to said scanning axis and an infrared radiation real image focal plane located between said lens and said support perpendicular to said scanning axis; an infrared radiation scanning drum rotatably mounted on said support intermediate said focal plane and said support on an axis perpendicular to said scanning axis and located in offset relation to said scanning axis, said drum having a periphery rotatable substantially through said focal plane; a plurality of uniformly spaced quartz spoke members radiating outwardly from said drum axis to its periphery perpendicular to said drum axis in a radial plane through said scanning axis, said spoke members having their outer ends located for successive scanning relation through said image plane when said drum is rotated; an infrared radiation blocking diaphragm fixed across the head in substantially parallel juxtaposed relation to said focal plane, between said focal plane and said lens means, said diaphragm having a narrow radial scanning slot therein from said scanning axis toward the periphery of said diaphragm in the plane containing the spoke members, said slot being substantially equal in length to the distance between the outer scanning extremities of each circumferentially spaced adjacent pair of said spoke members for causing said spoke members to successively scan the portion of said focal plane exposed through said slot, one spoke member at a time; infrared radiation responsive photo cell means positioned centrally within said drum intermediate the inner extremities of all of the spoke members and having an electrical voltage output proportional to infrared radiation received from said focal plane through said spoke members, an electrical voltage amplifier connected to the photo cell voltage output for amplification thereof having an amplified electrical output; a driving motor carried by said support, drive gear means between said motor and said head for rotating said head on said support to revolve the radial scanning slot around said scanning axis at a predetermined rate; hypoid gearing means between said motor and said scanning drum for rotating said scanning drum on its axis at a predetermined different rate from the rate of rotation of said head to pass the spoke extremities successively through the portion of said focal plane exposed through the slot at a predetermined relative scanning rate, a two-phase sine and cosine wave electrical generator driven by said motor in phase with the rate of rotation of said head; said amplifier having two parallel electrical outputs, means to gate respectively modulated reference voltages to said two power steering means for steering the support respectively in X and Y coordinate directions; including a first electrical gating control means connecting the reference voltage modulated output to said X coordinate direction steering means; a second electrical gating control means connecting the reference voltage modulated output to said Y coordinate direction steering means; a sawtooth wave generator operated in phase with the rate of rotation of said scanning drum to produce one sawtooth wave electrical output during the passage of the outer extremity of each spoke member through the portion of said focal plane exposed between the ends and side edges of said scanning slot; a sine wave modulator having an electrical input connected to said two-phase sine and cosine wave generator outputs and said sawtooth wave generator output to produce a combined sine wave and sawtooth wave output connected to the first gating control means to control the electrical output between said X modulator and said X coordinate direction steering means in phase with the sine wave output of the generator; a cosine wave modulator having an electrical input connected to said sine and cosine wave generator output and said sawtooth wave generator output to provide a combined cosine wave and sawtooth wave electrical output connected to said second gating control means to control the electrical output between said Y modulator output and said Y coordinate direction steering means.

13. A rotary scanning mechanism for radiant energy responsive apparatus, a main support having a central scanning axis, a rotary scanning head journaled on said main support for rotation about an axis concentric to said scanning axis, power drive means operable between said main support and said scanning head for rotating said scanning head on its axis relative to said main support, radiant energy focusing lens means fixed in said head and extending across said central scanning axis with its optical axis concentric to said scanning axis and having a radiant energy image focal plane across said scanning axis substantially perpendicular to said scanning axis, a radiant energy blocking diaphragm fixed in said rotary scanning head in juxtaposed substantially parallel relation to said focal plane and located between said focal plane and said lens means, said diaphragm having a narrow radial scanning slot therein outwardly from said scanning axis toward the periphery of said diaphragm, a rotary scanning member journaled in said rotary scanning head between said diaphragm and said main support on an axis perpendicular to said scanning axes in offset relation thereto, a plurality of radiant energy transmitting spoke members fixed in said rotary scanning member in uniformly spaced radial relation about the rotary axis of said rotary scanning member extending outwardly from its axis, said spoke members having outer scanning ends located in a radial plane from said central scanning axis passing through said narrow scanning slot substantially midway between its opposite side edges, to successively scan the portion of said focal plane exposed between the side edges of said scanning slot, said spoke members having their inner ends facing toward the rotary axis of said scanning member in radial spaced relation thereto in a plane perpendicular to the rotary axis of said scanning member, a radiant energy responsive receiving means located substantially within the center of said scanning member adjacent said inner ends of said spoke members, and positive drive means operable between said rotary scanning head and said rotary scanning member for rotating said scanning member at a predetermined rate on said scanning head.

14. Apparatus as claimed in claim 13 in which said rotary scanning member is shiftable axially to displace the plane of rotation of the outer ends of said spoke members out of registration with said scanning slot, a second set of similar spoke members, greater in number than the number of the first mentioned spoke members and fixed in said scanning member in a plane parallel to and axially spaced from the plane of rotation of the outer ends of the first mentioned spoke members, said second set of spoke members comprising a plurality of pairs of side-by-side spokes similar in size and arrangement to the side-by-side spokes of the first mentioned spoke members, and arranged to successively traverse a predetermined portion of said image focal plane exposed through said scanning slot during rotation of said scanning member in place of said first mentioned spoke members when said scanning member is in said axially shifted position in said scanning head, a shutter mounted in said scanning head for movement across a predetermined portion of said scanning slot for shortening the effective length of the scanning slot to substantially the distance between two of said adjacent spoke members in the second set of said spoke members, and actuating means connected between said shutter and said rotary scanning member for simultaneously shifting said scanning member to position the plane of rotation of the second set of spoke members for registration between the sides of said scanning slot and to move said shutter across said scanning slot to reduce the effective length of said slot to agree substantially with the distance between the outer ends of the adjacent spoke members of said second set.

15. In an apparatus as claimed in claim 13, sawtooth electrical wave generating means connected for actuation by said rotary scanning member for generating of successive sawtooth wave electrical signals in phase with successive scanning movements of the outer ends of said spoke members across the portions of said image plane exposed through said scanning slot, sine and cosine electrical signal generating means in said support connected for synchronized operation in phase with the rate of rotation of said scanning head on said main support, a sine wave signal modulator and a cosine wave signal modulator connected to modulate said sawtooth wave electrical signal, and electrical gating means actuated by a radiant energy target image in said focal plane to pass pickoff voltage pulses from said modulator means to the said control circuits proportional to the X and Y components of the position of a target in the said focal plane exposed through the slot in said diaphragm.

References Cited in the file of this patent

UNITED STATES PATENTS

| | | |
|---|---|---|
| Re. 17,784 | Jenkins | Aug. 26, 1930 |
| 1,859,597 | Nason | May 24, 1932 |
| 2,403,387 | McLennan | July 2, 1946 |
| 2,424,193 | Rost et al. | July 15, 1947 |
| 2,439,294 | Hammond | Apr. 6, 1948 |
| 2,479,953 | Miller | Aug. 23, 1949 |

FOREIGN PATENTS

| | | |
|---|---|---|
| 352,035 | Great Britain | June 22, 1931 |